United States Patent Office 3,189,655
Patented June 15, 1965

3,189,655
DIENALS
Benjamin Thompson, Box 511, Kingsport, Tenn.
No Drawing. Filed Dec. 22, 1961, Ser. No. 161,352
10 Claims. (Cl. 260—601)

This invention relates to diene aldehydes and to a process for making them. More specifically, it relates to unsubstituted 3,4-dienals and 2-alkyl-3,4-dienals and their conjugated isomers and the vapor phase preparation thereof from acetylenic alcohol acetals of straight-chain aldehydes and aldehydes having at least one α-hydrogen.

In my co-pending application, Serial No. 75,475, filed December 13, 1960, I have disclosed the synthesis of 3,4-dienaldehydes, hereinafter called dienals, of the formula

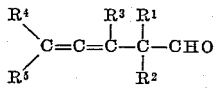

wherein $R^1$, $R^2$, $R^3$, $R^4$, and $R^5$ are hydrogen, alkyl, cycloalkyl or alkenyl. I have now discovered a new vapor-phase method which provides an improved way of preparing such compounds, particularly those 3,4-dienals prepared from aldehydes having no or only one substituent group in the 2 position. Heretofore the greater activity of the single hydrogen atom remaining after a straight-chain aldehyde having no substitution in the 2 position is reacted with the acetylenic alcohol has sometimes caused a further reaction which may consume some of the 3,4-dienal product. For example, for propionaldehyde in the liquid phase reaction there may be less opportunity for the allenic aldehyde formed to accumulate due to the reactive α-hydrogen remaining which apparently results in the formation of 2,2-diallenyl propionaldehyde. With so many reactive groups present, this product can be rapidly lost by what may well be further condensation reactions.

Accordingly, it is an object of this invention to provide an improved vapor-phase process for the preparation of unsubstituted 3,4-dienals and 2-alkyl-3,4-dienals as well as 2,2-substituted 3,4-dienals and conjugated dienals formed from them by isomerization or a shift of a double bond. Another object is to provide a novel one-step vapor phase catalytic process for the production of 3,4-dienals from acetylenic acetals prepared from straight-chain aldehydes or aldehydes having at least one α-hydrogen. Other objects will appear hereinafter.

I have now found surprisingly that dienals of the above-recited formula and 2,4-diene isomers thereof wherein one or both of $R^1$ and $R^2$ are hydrogen may be prepared by an improved method in which acetylenic alcohol acetals of straight-chain aldehydes or aldehydes having at least one α-hydrogen are contacted in the vapor phase in the presence of a metal-containing catalyst, preferably a molybdenum oxide. Where the product is 2,2-dialkyl substituted, 3,4-dienaldehydes are the major product. 3,5-dienals may be a minor product where the fifth carbon is disubstituted. On the other hand, where the product is unsubstituted or mono-substituted in the 2 position, considerable amounts of the 3,5-dienal may be isomerized to the conjugated 2,4-dienaldehydes, especially upon prolonged contact time or increased temperature.

By a metal-containing catalyst I mean a metal, metal oxide, metal salt, or metal complex catalyst which may be supported on a suitable carrier, for example, an aluminum silicate, an active carbon, bauxite, asbestos or the like. The metal salt may be one that decomposes, such as the nitrate or oxalate or a salt from an acid that will provide an acidic type complex such as sulphate, phosphate, silicate or the like. The complexes may be prepared by precipitating a mixture of the salts of the metals on a suitable carrier and then heating in a reducing atmosphere initially. Preferred metal-containing catalysts include the metals and metal oxides of Groups I and II of the Mendeleev Periodic Table where the metals have an atomic number of at least 29 and of Groups V through VIII of the Mendeleev Periodic Table, mixtures of the preceding metals, mixtures of the preceding metal oxides, and mixtures of the specific metals and metal oxides of said groups I and II and V through VIII classification. Representative catalysts that may be used include copper-zinc, silver-zinc, and silver-zinc mixtures and complexes, silver-zinc or tin complexes, and the following metals or oxides, salts, mixtures or complexes thereof: vanadium, chromium, tin, copper, zinc, silver manganese, iron, cobalt, nickel, tungsten, platinum and the like. In my preferred embodiment the catalyst is a molybdenum oxide (principally $Mo_2O_3$ but not excluding MoO) or a supported molybdenum oxide.

By acetylenic alcohol acetals I mean acetals of the formula

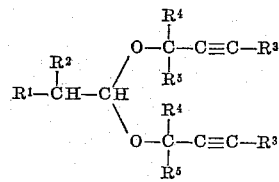

which are prepared from a propargyl alcohol or substituted propargyl alcohol of the formula

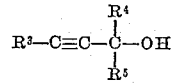

wherein $R^3$, $R^4$ and $R^5$ are alkyl, cycloalkyl, joined lower alkylene which with the carbon atom to which they are attached form a carbocyclic ring, e.g., as in cyclopentanols and cyclohexanols having an acetylenic substituent in the 1-position or alkenyl as in the aforementioned dienal formula. Acetylenic alcohols that may be used include propargyl alcohol, 3-methyl-1-pentyn-3-ol, 3-methyl-1-butyln-3-ol, 1-hexyn-3-ol, 4-ethyl-1-octyn-3-ol, 3-methyl-1-nonyne-3-ol, 1-ethynyl cyclohexanol, 1-ethynylcyclopentanol, 2,2,6-trimethyl-1-ethynycyclohexanol, and the like. The term propargyl alcohol as used herein includes substituted propargyl alcohols.

The acetals which may be cracked according to my process may be produced by reacting a straight-chain aldehyde or an aldehyde having at least one α-hydrogen, i.e., an aldehyde of the formula, $R^1R^2CHCHO$, with an acetylenic alcohol such as just described in the presence of an acidic catalyst. Suitable aldehydes include: acetaldehyde, propionaldehyde, butyraldehyde, valeraldehyde, 3-methyl-pentanaldehyde, paraldehyde, n-butylaldehyde, isobutyraldehyde, 2-methyl-pentanaldehyde, 2-methylbutylaldehyde, 2-ethylbuytraldehyde, 2-methylhexanaldehyde, 2-ethylhexanaldehyde, and the like.

Operating ranges for the improved process of this invention include a cracking temperature range of 200–400° C., the preferred temperature range being from about 250° C. to about 350° C., a pressure of from a mild vacuum to about 100 p.s.i.g., preferably essentially atmospheric, and a contact time of up to about one minute, preferably from about 1 to 10 seconds. Contact time is defined as the time in seconds that the gaseous feed is in contact with the catalyst at reaction conditions of temperature and pressure. Suitable acidic catalysts for the aldehyde-alcohol reaction to produce the acetals for cracking include phosphoric acid, toluene-sulfonic acid, methionic acid, boron trifluoride, acidic ion exchange resins and the like.

A convenient way of separating the 3,4-dienals formed according to the process of my invention is by extraction with a hydrocarbon solvent such as hexane or heptane.

My invention is illustrated but not limited by the following examples.

Example 1

Acetaldehyde dipropargyl acetal was prepared by reacting paraldehyde and propargyl alcohol using p-toluenesulfonic acid as catalyst. The equilibrium mixture was neutralized and fractionated to recover the acetal, $n_D^{20}$ 1.4460. Propionaldehyde and isobutyraldehyde acetals and other acetals of acetylenic alcohols were prepared and isolated in the same manner.

Example 2

Acetaldehyde dipropargyl acetal was passed over a molybdenum oxide $Mo_2O_3$, 30–60 mesh catalyst for a contact time of 2 seconds at 300° C. The products were analyzed. Fifteen percent by weight (approximately 1 mole) of the starting acetaldehyde dipropargyl acetal had reacted to form yields of products as follows:

0.27 mole vinyl propargyl ether
0.52 mole 3,4-pentadienal
0.85 mole propargyl alcohol The identity of the vinyl propargyl ether, 3,4-pentadienal, and also of 2,2-diemthyl-3,4-pentadienal was confirmed by use of a spectrograph and by infrared analysis, the $$H_2C=C=CH-$$

of the 3,4-dienals being shown by a strong absorption at 5.1 microns.

Example 3

Following the procedure of Example 2 propionaldehyde dipropargyl acetal, B.P. 123° C., $n_D^{20}$ 1.4462–69, was passed over a molybdenum oxide catalyst at 275° C. with 4–6 seconds contact time to produce 2-methyl-3,4-pentadienaldehyde, B.P. 50–54° C. at 100 mm. pressure, in 15% conversion. As the contact time and/or temperature was increased, increasing amounts of the 3,4-dienaldehyde isomerized to the conjugated 2-methyl-2,4-pentadienaldehyde, B.P. 75–80° C. at 100 mm. pressure.

Example 4

Isobutyraldehyde dipropargyl acetal was passed over a molybdenum oxide catalyst at various temperatures ranging from 260–320° C. according to the procedure of Example 2. At 320° C. and a contact time of 2 seconds complete decomposition of the acetal occurred (100% conversion) to give 0.82 mole 2,2-dimethyl-3,4-pentadienal, 0.76 mole propargyl alcohol, about 0.6 mole isobutenyl propargyl ether and the remainder of isobutyraldehyde and other low boilers. At 260° C. with 43% conversion the yield of 2,2-dimethyl-3,4-pentadienal was over 0.90 mole, with propargyl alcohol again being somewhat lower. The identity of the 2,2-dimethyl-3,4-pentadienal was confirmed by mass spectroscopic analysis, infrared absorption, and a B.P. determination (B.P.=132° C.).

Example 5

Propionaldehyde dipropargyl acetal was passed over a catalyst containing 20% by weight of said catalyst of silver and zinc in a 1:1 ratio supported on active carbon (prepared by decomposing a mixture of their oxalate salts) at 350° C. with a contact time of less than 60 seconds. The products were condensed and analyzed to recover propargyl alcohol, unreacted acetal, and a 12% conversion to 2-methyl-3,4-pentadienaldehyde and isomers thereof. Similarly, with a copper-zinc catalyst, an 8% conversion was obtained.

In the preceding examples, percent conversion refers to the percent by weight of the acetal starting material actually cracked to form the dienal and by-products. The term moles when used to refer to the products formed means in each case moles per mole of acetal starting material actually converted to the products.

The 3,4-dienals prepared according to the process of this invention may be used as intermediates for isomerization to the conjugated dienaldehydes or partial hydrogenation to the 3- or 4-olefinic aldehydes. Other uses are described in my above-mentioned co-pending application Serial No. 75,475.

Although the invention has been described in considerable detail with particular reference to certain preferred embodiments thereof, variations and modifications can be effected within the spirit and scope of the invention as described hereinabove, and as defined in the appended claims.

I claim:

1. A process for the preparation of dienals which comprises cracking in the vapor phase at 200° C. to 400° C., in the presence of a solid metal-containing cracking catalyst and for a contact time up to about one minute, an acetylenic alcohol acetal of the formula:

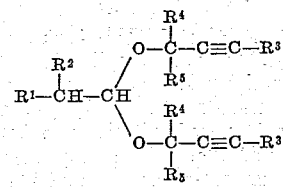

and collecting a dienal of the formula:

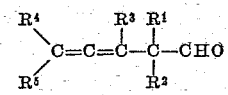

wherein $R^1$, $R^2$, $R^3$, $R^4$ and $R^5$ are selected from the group consisting of hydrogen and lower alkyl and wherein $R^4$ and $R^5$ together with the carbon atom to which they are attached form a saturated carbocyclic ring selected from the group consisting of a saturated carbocyclic hydrocarbon ring having 5 carbon atoms and a saturated carbocyclic hydrocarbon ring having 6 carbon atoms.

2. The process according to claim 1 wherein the catalyst comprises molybdenum oxide.

3. The process according to claim 1 wherein the cracking in the vapor phase is accomplished at a temperature of from about 250° C. to 350° C.

4. The process according to claim 1 wherein the pressure at which the cracking is accomplished is not greater than 100 p.s.i.g.

5. A process for the preparation of dienals which comprises contacting a propargyl alcohol acetal of an aldehyde of the formula, $R^1R^2CHCHO$, wherein $R^1$ and $R^2$ are selected from the group consisting of hydrogen and lower alkyl, in gaseous form with a catalyst from the group consisting of metals of groups I and II of the periodic table having an atomic number of at least 29, metals of groups V through VIII of the periodic table and oxides, salts and metal complexes of such metals at a temperature of from 200° C. to 400° C. and a pressure of up to 100 p.s.i.g. for no longer than one minute and collecting the dienal formed.

6. The process according to claim 5 wherein the temperature is from about 250° C. to about 350° C., the pressure about atmospheric and the contact time from about 1 to about 10 seconds.

7. The process according to claim 5 wherein the catalyst comprises molybdenum oxide.

8. The process according to claim 5 wherein the acetal is acetaldehyde dipropargyl acetal and the 3,4-dienal collected 3,4-pentadienal.

9. The process according to claim 5 wherein the acetal is propionaldehyde dipropargyl acetal and the 3,4-dienal collected 2-methyl-3,4-pentadienal.

10. The process according to claim 5 wherein the acetal is isobutyraldehyde dipropargyl acetal and the 3,4-dienal collected 2,2-dimethyl-3,4-pentadienal.

References Cited by the Examiner
UNITED STATES PATENTS

| | | | |
|---|---|---|---|
| 2,563,325 | 8/51 | Fahnoe | 260—615 |
| 2,759,979 | 8/56 | Hagemeyer et al. | 260—601 |
| 2,947,786 | 8/60 | Brannock | 260—601 |

OTHER REFERENCES

Fieser and Fieser, Organic Chemistry, 3rd edition, 1956, p. 85.

Fieser and Fieser, Advanced Organic Chemistry, pp. 996–997.

Piganiol: "Acetylene Homologs and Derivatives," 1950, pp. 92, 93.

LEON ZITVER, *Primary Examiner.*

CHARLES B. PARKER, *Examiner.*

UNITED STATES PATENT OFFICE
CERTIFICATE OF CORRECTION

Patent No. 3,189,655　　　　　　　　　　　　　　　　　　June 15, 1965

Benjamin Thompson

It is hereby certified that error appears in the above numbered patent requiring correction and that the said Letters Patent should read as corrected below.

In the grant, lines 1 to 3, for "Benjamin Thompson, of Kingsport, Tennessee," read -- Benjamin Thompson, of Kingsport, Tennessee, assignor to Eastman Kodak Company, of Rochester, New York, a corporation of New Jersey, --; line 12, for "Benjamin Thompson, his heirs" read -- Eastman Kodak Company, its successors --; in the heading to the printed specification, line 3, for "Benjamin Thompson, Box 511, Kingsport, Tenn." read -- Benjamin Thompson, Kingsport, Tenn., assignor to Eastman Kodak Company, Rochester, N. Y., a corporation of New Jersey --.

Signed and sealed this 18th day of January 1966.

(SEAL)
Attest:

ERNEST W. SWIDER　　　　　　　　　　　　　　　EDWARD J. BRENNER
Attesting Officer　　　　　　　　　　　　　　　Commissioner of Patents